(12) United States Patent
Biskeborn et al.

(10) Patent No.: US 7,119,976 B2
(45) Date of Patent: Oct. 10, 2006

(54) PLANAR SERVO FORMAT VERIFIER HEAD

(75) Inventors: Robert Glenn Biskeborn, Hollister, CA (US); Leif Stefan Kirschenbaum, San Francisco, CA (US); Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 11/034,494

(22) Filed: Jan. 12, 2005

(65) Prior Publication Data

US 2006/0152851 A1    Jul. 13, 2006

(51) Int. Cl.
*G11B 5/09* (2006.01)

(52) U.S. Cl. .......................... 360/53; 360/75

(58) Field of Classification Search ................. 360/53, 360/75, 322, 125, 126, 319, 320, 321, 77.12, 360/77.01, 77.08, 78.02; 29/603.01; 428/332; 216/22

See application file for complete search history.

(56) References Cited

U.S. PATENT DOCUMENTS

| | | | |
|---|---|---|---|
| 5,361,547 A | | 11/1994 | Church et al. ................ 451/5 |
| 5,689,384 A | | 11/1997 | Albrecht et al. ......... 360/77.12 |
| 5,828,513 A | * | 10/1998 | Greenberg .............. 360/77.08 |
| 5,946,167 A | * | 8/1999 | Hara et al. ................... 360/322 |
| 6,018,444 A | | 1/2000 | Beck et al. ................ 360/121 |
| 6,462,904 B1 | | 10/2002 | Albrecht et al. ............ 360/122 |
| 6,524,491 B1 | * | 2/2003 | Liu et al. .................... 216/22 |
| 6,579,612 B1 | * | 6/2003 | Lille ............................ 428/332 |
| 6,741,415 B1 | * | 5/2004 | Okuda et al. ................ 360/75 |
| 6,947,256 B1 | * | 9/2005 | Biskeborn et al. .......... 360/126 |
| 7,016,143 B1 | * | 3/2006 | Kirschenbaum et al. . 360/77.12 |
| 2002/0186497 A1 | | 12/2002 | Nakao et al. ............. 360/77.13 |
| 2003/0030939 A1 | | 2/2003 | Beck et al. ................. 360/121 |
| 2005/0235483 A1 | * | 10/2005 | Biskeborn et al. ....... 29/603.01 |

* cited by examiner

*Primary Examiner*—Fred F. Tzeng
(74) *Attorney, Agent, or Firm*—Wiliam D. Gill; Jeffrey P. Aiello

(57) ABSTRACT

A planar servo verifier head is provided comprising a plurality of magnetic head elements optimized for the readback process. The plurality of magnetic head elements are fabricated in a planar two-dimensional array in which individual elements can be used to read servo format tracks spaced across the width of a magnetic tape. In one embodiment, the magnetic head element comprises a read transducer formed of one or more turns of a sense wire inductively coupled to a magnetic yoke in a trench formed on the transducing surface of a substrate. In another embodiment, the magnetic head element comprises a read transducer formed of a thin film magnetoresistive sensor coupled to a magnetic flux guide in a trench formed on the transducing surface of a substrate. According to the method for manufacturing an embodiment of the servo verifier read head for magnetic tape recording, a plurality of trenches are formed in a nonmagnetic substrate wafer, preferably, a ceramic wafer. A first magnetic permeable layer is deposited in the trench. A first insulating layer is deposited on the first magnetic permeable layer. A conducting circuit is defined on the first insulating layer such as by lithographically defining the circuit. A second insulating layer is deposited in the trench such that the conducting circuit is enclosed between the first and second insulating layers. The wafer can be planarized down to about the original surface level of the wafer. A pattern of read gaps is defined and a second magnetic layer is added over the second insulating layer.

16 Claims, 5 Drawing Sheets

SECTION A-A

SECTION A-A

PLANAR SERVO FORMAT VERIFIER HEAD

BACKGROUND OF THE INVENTION

1. Field of the Invention

This invention relates generally to recording and reading data from magnetic storage media and, more particularly, to servo format verifier heads to verify servo patterns used to maintain the position of a magnetic head relative to tracks in magnetic storage media.

2. Description of the Related Art

The recording and reading of data in tracks on magnetic storage media requires precise positioning of magnetic read/write heads. The read/write heads must be quickly moved to, and maintained centered over, particular data tracks as recording and reading of data takes place. The magnetic heads can record and read data as relative movement occurs between the heads and the magnetic storage media in a transducing direction. The heads are moved from track to track across the width of the tracks in a translating direction, which is perpendicular to the transducing direction.

For example, a recordable disk typically contains concentric data tracks and is rotated beneath a magnetic head. The direction of rotation defines the transducing direction. Radial movement from track to track defines the translating direction. A magnetic tape typically contains data tracks that extend along the length of the tape, parallel to the tape edges, in the transducing direction. In magnetic tape helical scan systems, however, the tape is moved beneath heads that are moved at an angle across the width of the tape, the diagonal direction defining the transducing direction.

Storage devices that read and record data on magnetic media typically use servo control systems to properly position the data heads in the translating direction. The servo control systems derive a position signal from a servo magnetic head that reads servo control information recorded in servo tracks on the storage media. A track following servo control system in a magnetic media storage device derives head position information from one or more specially patterned servo tracks. The servo patterns are comprised of magnetic transitions recorded at more than one azimuthal orientation in a servo track, such that the timing of the servo position signal pulses derived from reading the servo pattern at any point on the pattern varies continuously as the head is moved across the width of the servo track.

Servo control systems that maintain the position of a magnetic head relative to tracks in magnetic storage media are well known. European Patent Application EP 0 690 442 A2, published Jan. 3, 1995, entitled "Servo Control System", Albrecht et al., describes a servo control system having a magnetic recording head for writing servo position code at discrete locations across the width of the magnetic recording tape and down the length of the tape. The advantage of such a recording head is the ability to write servo code along the entire length of the tape in discrete areas (bands) across the width of the tape in a single pass. This increases position accuracy of one pattern with respect to another.

It is often necessary to verify that a servo format pattern has been properly written on tape magnetic media. One method of verification is to use a tape head's servo read transducer elements to verify the servo format patterns, however this method only monitors a few bands of the servo format. A special version of a regular tape head specifically tailored to the servo format verification process could be designed, developed and fabricated, however this approach involves considerable development and cost.

Therefore, an unresolved need exists for a magnetic head that provides the desired servo format verification function that can be developed and manufactured efficiently at a reduced cost.

SUMMARY OF THE INVENTION

A magnetic read head and method for bulk fabrication of the same are provided. In accordance with the principles of the present invention, there is disclosed a planar servo format verifier head comprising a plurality of magnetic head elements optimized for the readback process. The plurality of magnetic head elements are fabricated in a planar two-dimensional array in which individual elements can be used to read servo format tracks spaced across the width of a magnetic tape.

In one embodiment, the servo format verifier head comprises a plurality of magnetic head elements wherein each head element includes a read transducer formed of one or more turns of a sense wire. The planar head elements comprise a nonmagnetic substrate having a trench, a first magnetically permeable layer positioned in the trench, a first insulating layer in the trench, a conducting circuit for inductively sensing a magnetic flux, a second insulation layer, a second magnetic layer having a read gap positioned over the trench, and an overlayer. The current carrying conductor is a coiled structure, preferably a pancake coil having a plurality of turns of a planar conductor disposed in the trench.

In another embodiment, the servo format verifier head comprises a plurality of magnetic head elements wherein each head element includes a read transducer formed of a thin film magnetoresistive (MR) sensor. The planar head elements comprise a nonmagnetic substrate having a trench, a first magnetically permeable layer positioned in the trench, a first insulating layer in the trench, a thin film MR sensor for sensing a magnetic flux, a second insulation layer, a second magnetic layer having a read gap positioned over the trench, and an overlayer. The MR sensors may comprise anisotropic magnetoresistive (AMR), giant magnetoresistive (GMR), magnetic tunnel junction (MTJ) sensors or other sensors known to the art.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

Figure 1A:
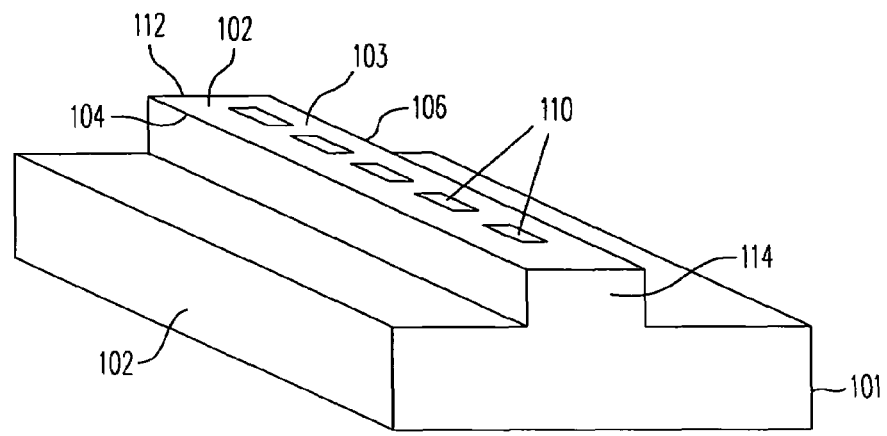
FIG. 1a is a perspective view, not to scale, of a planar flat servo verifier read head.
Figure 1B:
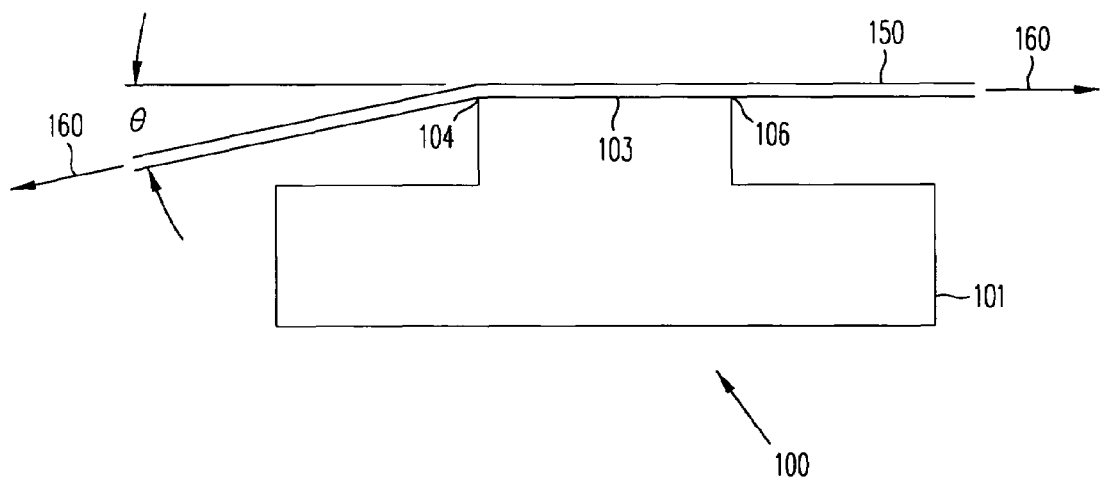
FIG. 1b is a cross-sectional view, not to scale, of a planar flat servo verifier read head.

FIG. 1a shows perspective view, not to scale, of a planar flat servo verifier read head 100 for a tape recording system according to an embodiment of the invention. FIG. 1b is a cross-sectional view of the read head 100. Referring now to FIGS. 1a and 1b, the planar flat servo verifier read head 100 comprises a nonmagnetic substrate 101 in the form of a bar 102 having first and second ends 112 and 114 and a flat transducing surface 103 with a plurality of servo verifier read gaps 110 spaced along the length of the surface 103. A magnetic recording tape 150 moves in contact or near contact with the flat transducing surface 102 in left or right directions as indicated by arrows 160. The transducing surface 102 has a first edge 104 at which the tape 150 bends forming a controlled overwrap angle θ and a second edge 106. As the tape moves over the transducing surface 102, the sharp edge 104 scrapes (skives) the air from between the transducing surface 102 and the recording tape 150 creating a partial vacuum which promotes close contact of the tape with the transducing surface. The servo verifier read gaps 110, each associated with a servo verifier read head, are spaced to correspond to a plurality of servo tracks spaced across the width of the magnetic recording tape 160 in a direction substantially perpendicular to the direction of tape motion 160.

Figure 2:
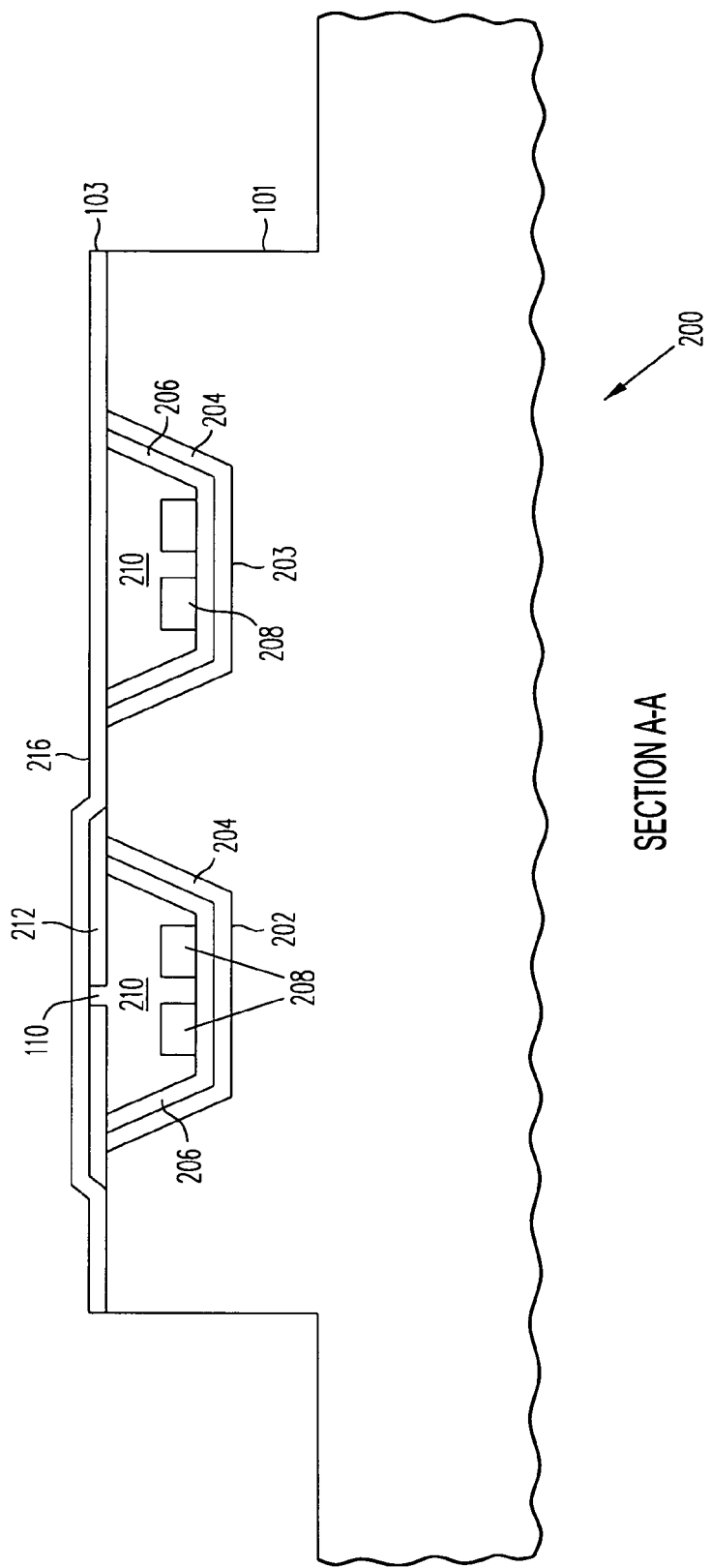
FIG. 2 is a cross sectional view, not to scale, of a servo verifier read head according to one embodiment of the invention.

FIG. 2 shows a cross-sectional view (Section A—A of FIG. 3), not to scale, of an embodiment of a servo verifier read head 200 according to the invention wherein the read transducer comprises a planar inductive coil to sense magnetic signals from the magnetic tape recording media. The read head 200 comprises parallel first and second trenches 202 and 203, respectively, formed in the nonmagnetic substrate 101. A first magnetic layer 204, a first insulating layer 206 on the first magnetic layer 204, a conductor 208 formed on the first insulating layer 206, a second insulating layer 210 over the first insulating layer 206 and the conductor 208, and a second magnetic layer 212 on the second insulating layer 210 are formed in the first trench 202. A read gap 110 extends through the second magnetic layer 212. Similarly, a first magnetic layer 204, a first insulating layer 206, a conductor 208, a second insulating layer 210 are formed in the second trench. An overlayer 216 is deposited over the flat transducing surface 103. The conductor 208 comprises a flat planar coil having one or more turns (2 turns are illustrated in FIG. 2) threading the first and second trenches 202 and 203.

Figure 3:
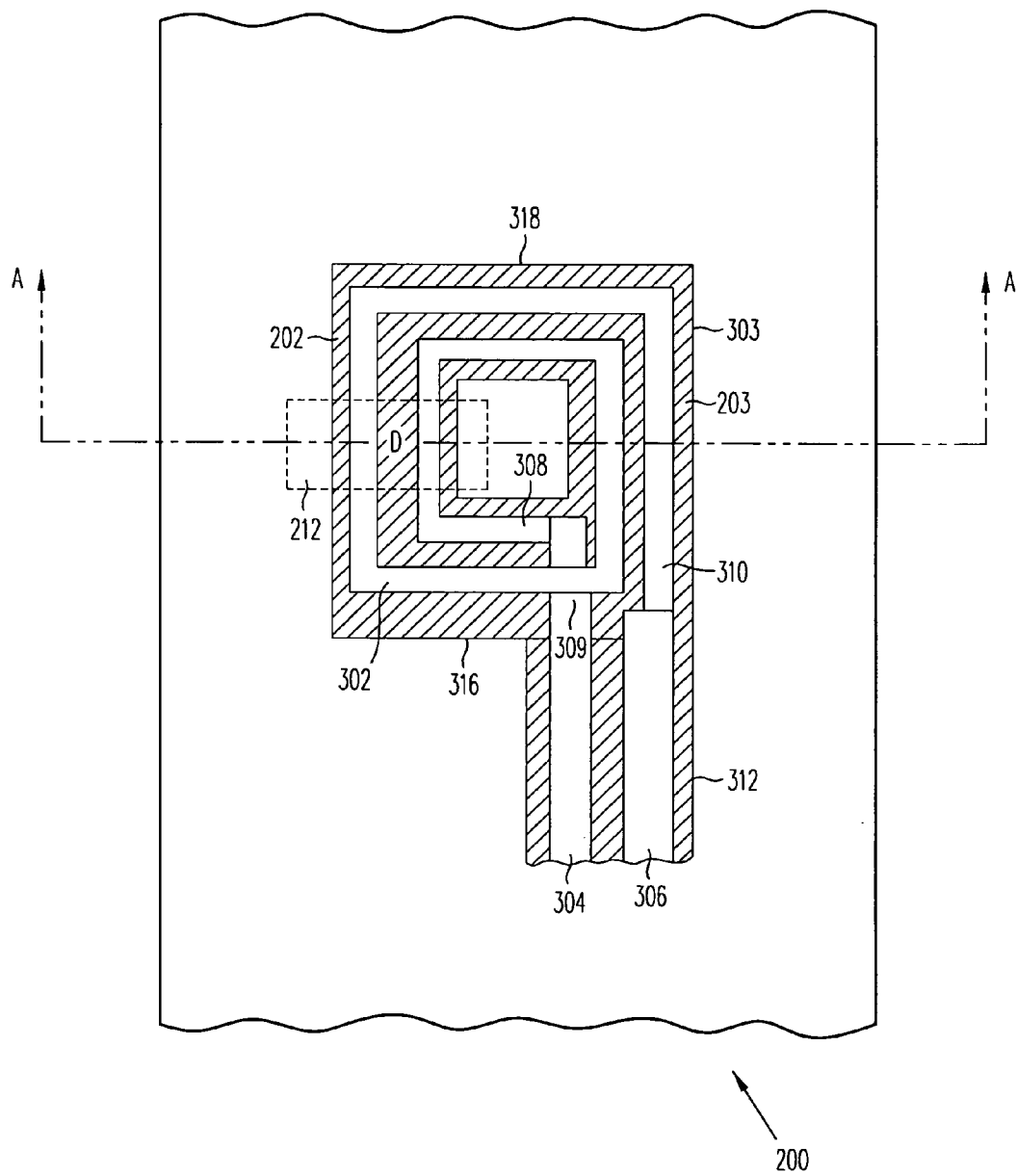
FIG. 3 is a plan view, not to scale, of the servo verifier read head of FIG. 2.

FIG. 3 is a plan view of the servo verifier read head 200 shown in FIG. 2 illustrating the layout of the flat planar coil 302. The planar coil is formed in an essentially square trench 303 (shaded area in FIG. 3) formed by connecting the ends of first and second trenches 202 and 203 with cross trenches 316 and 318. Conductive leads 304 and 306 formed in a channel 312 extending to one of the ends 112, 114 of the substrate 101 (shown in FIG. 1) connect the inner and outer ends 308 and 310, respectively, of the planar coil 302 to electrical connection cables (not shown) connecting the inductive planar coil read transducer to the read channel of the associated tape drive. The second magnetic layer 212 with its read gap 210 overlying the first trench 202 is shown in phantom for clarity.

First and second magnetic layers 204 and 212 form a magnetic circuit enclosing the turns of coil 302 in the first trench 202. Signal magnetic fields from bits recorded on the magnetic media proximate to the read gap 110 produce a magnetic flux in the magnetic circuit or yoke of first and second magnetic layers 204 and 212 inducing a voltage in planar coil 302. The induced read voltage is proportional to the number of turns forming the coil, therefore the read head sensitivity may be increased to a desired level by increasing the number of turns of coil 302.

The servo verifier read head 200 may be fabricated on a ceramic substrate 101 by etching or milling a trench 303, plating a first magnetic layer 204, preferably Ni—Fe, over the sides and bottom of the trench, and depositing a first insulating layer 206, preferably $Al_2O_3$ or $SiO_2$, over the first magnetic layer. Planar coil 302, preferably copper, is defined and deposited over the first insulating layer 206 in the bottom of the trench using photolithographic and thin film deposition or plating processes followed by deposition of right second insulation layer 210, preferably $Al_2O_3$ or $SiO_2$. The second magnetic layer 212, preferably Ni—Fe, is defined and plated over the first trench 202 and read gap 110 is opened by etching or milling. Finally, overlayer 216, preferably $Al_2O_3$ or a hard ceramic material is deposited over the entire transducing surface 102.

Conductive leads 304 and 306 may be connected to the planar coil by forming vias through the second insulating layer 210 over the inner and outer ends 308 and 310 of the coil followed by deposition of the leads over the second insulating layer. Alternatively, an insulated underpass 309 or overpass may be used to connect the inner end 308 of the coil to the conductive lead 304 as is known in the art.

Figure 4:
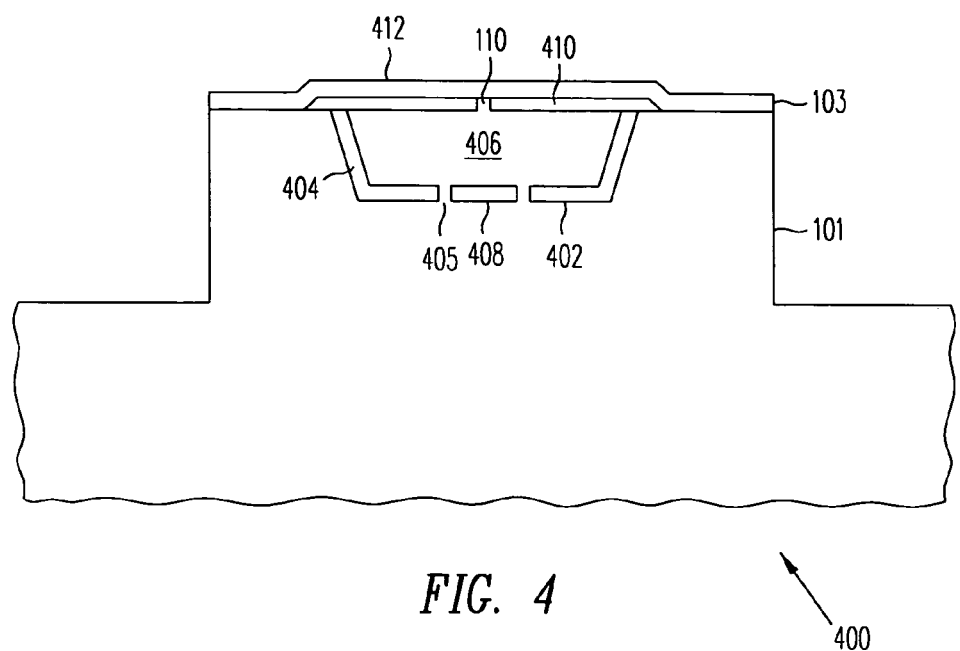
FIG. 4 is a cross-sectional view, not to scale, of a servo verifier read head according to a second embodiment of the invention.

FIG. 4 shows a cross-sectional view of an embodiment of a servo verifier read head 400 according to the invention wherein the read transducer comprises a magnetoresistive (MR) sensor to sense magnetic signals from the magnetic tape recording media. The read head 400 comprises a trench 402 formed in the nonmagnetic substrate 101. A first magnetic layer 404 is formed on the sides and bottom of the trench. An MR sensor 408 is formed in a gap 405 in the first magnetic layer 404 at the bottom region of the trench. The MR sensor 408 may be an AMR sensor, a GMR sensor, a MTJ sensor or any other magnetoresistive sensor known to the art. An insulating layer 406 is formed over the first magnetic layer 404 and the MR sensor 408 and a second magnetic layer 410 is formed over the insulating layer 406. A read gap 110 extends through the second magnetic layer 410. First and second magnetic layers 404 and 410 form a magnetic circuit or yoke which functions as a flux guide from the read gap 110 to the MR sensor 408 in the gap 405 of the second magnetic layer 410. On overlayer 412 is deposited over the flat transducing surface 103.

Figure 5:
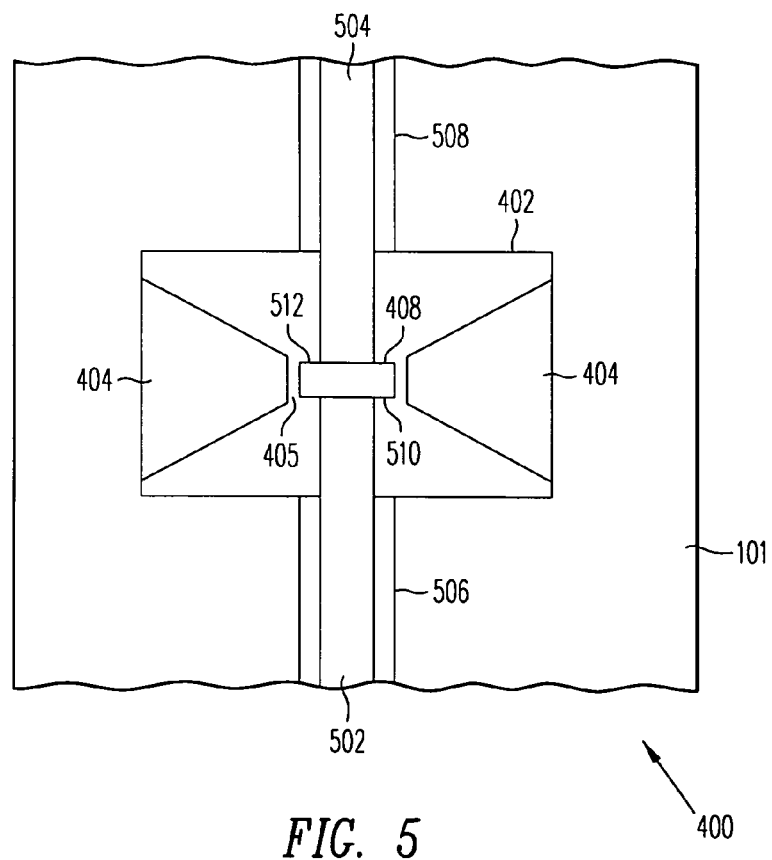
FIG. 5 is a plan view, not to scale, of the servo verifier read head of FIG. 4.

FIG. 5 is a plan view of the servo verifier read head 400 shown in FIG. 4. The first magnetic layer 404 at the bottom of trench 402 is tapered toward the gap 405 to focus the magnetic flux at the MR sensor 408. The MR sensor 408 comprises a layered thin film structure wherein the layers are deposited in the plane of the transducing surface 103. Conductive leads 502 and 504 for providing a sensing current in a longitudinal direction in the MR sensor are formed in channels 506 and 508 extending to the ends 112, 114 of the substrate 101 (shown in FIG. 1). Leads 502 and 504 connect the side regions 510 and 512 of the MR sensor 408 to electrical connection cables (not shown) connecting the sensor to the read/write channel of the associated tape drive. Alternatively, conductive leads may be provided out of the backside of the conductive substrate.

The servo verifier read head 400 may be fabricated on the substrate 101 by etching or milling a trench 402 and channels 502 and 504 leading from the trench to the ends 112, 114 of the substrate 101. A first magnetic layer 404, preferably Ni—Fe, is plated over the sides and bottom of the trench leaving a gap 405 in the magnetic layer at the bottom region of the trench. Alternatively, an insulation layer may be formed on a ceramic substrate 101 and the trench 402 and channels 502 and 504 may be formed in the insulation layer by etching or milling followed by deposition of the first magnetic layer 404 over the sides and bottom of the trench. An MR sensor 408 is formed in the gap 405 using photolithographic and thin film deposition processes known to the art. Conductive leads 502 and 504, preferably gold or copper, are deposited in the channels 502 and 504 connecting the side regions 510 and 512 of the MR sensor to contact pads (not shown) at the ends 112, 114 of the substrate 101. Insulation layer 406, preferably $Al_2O_3$, is deposited over the first magnetic layer 404, the MR sensor 408 and the channels 502 and 504. The second magnetic layer 410, preferably Ni—Fe, is defined and plated over the trench 402 and read gap 110 is formed either by etching or milling. Finally, overlayer 412, preferably $Al_2O_3$ or a hard ceramic material is deposited over the entire transducing surface 102.

Figure 6:
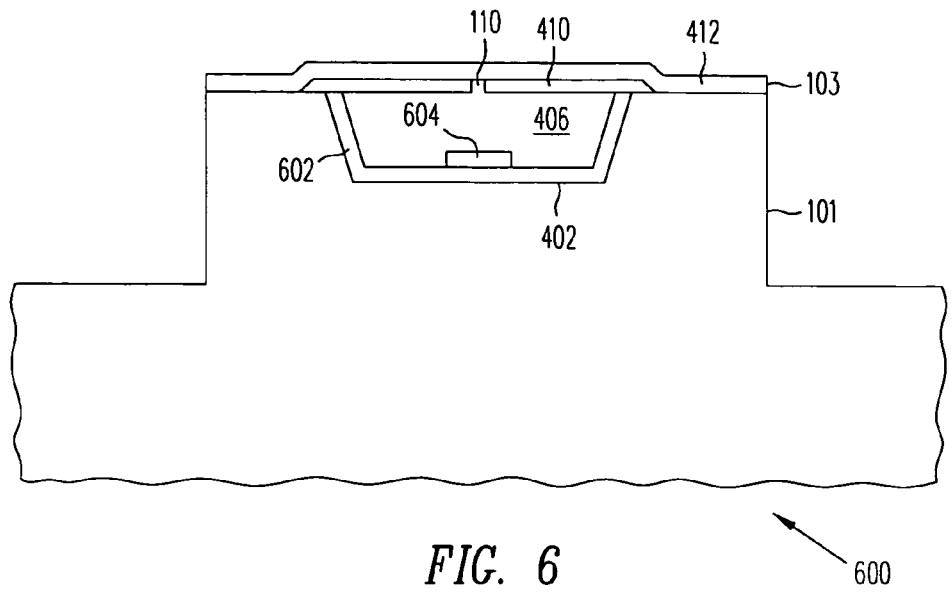
FIG. 6 is a cross-sectional view, not to scale, of a servo verifier read head according to a third embodiment of the invention.

FIG. 6 shows a cross-sectional view of another embodiment of a servo verifier read head 600 according to the invention wherein the read transducer comprises a magnetoresistive (MR) sensor to sense magnetic signals from the magnetic tape recording media. The read head 600 differs from the read head 400 shown in FIGS. 4 and 5 in having no gap in the first magnetic layer 602 and having the MR sensor 604 deposited on the first magnetic layer at the bottom of the trench 402. Magnetic flux in the yoke formed by magnetic first and second magnetic layers 602 and 410 is coupled into the MR sensor 604.

Figure 7:
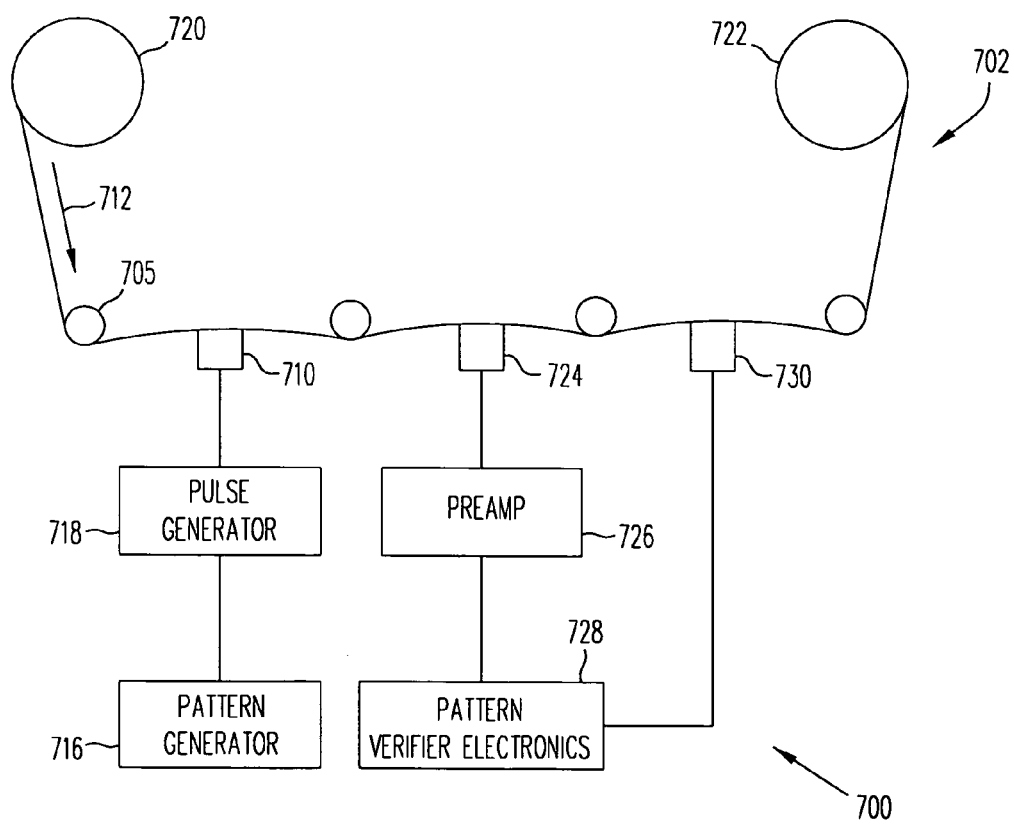
FIG. 7 is a schematic diagram of a servo formatting system using the planar servo verifier read head of the present invention.

FIG. 7 is a schematic diagram of a servo formatting system 700 incorporating the servo verifier read head of the present invention. A tape drive 702 passes a tape 704 from a supply reel 720 to a take-up reel 722 in the direction indicated by the arrow 712 as a servo pattern is recorded onto the tape. A pattern generator 716 produces the pattern pulses, which are provided to a servo write head 710. After the tape 704 is recorded with the servo pattern, the pattern must be verified to assure high quality. A servo verifier read head 724 reads the just recorded servo pattern and provides a servo signal to a pre-amplifier 726. The pre-amplifier provides an amplified version of the servo signal to a pattern verifier 728 that performs a variety of verifying operations, such as checking the servo pattern, signal amplitude, dropout rate, and consistency of redundant servo tracks. The verifier causes a bad-tape marking head 730 to place a magnetic mark on the tape 704 if any errors are found so that bad sections of tape are not loaded into a tape cartridge.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

We claim:

1. A magnetic head comprising:
   a nonmagnetic substrate;
   at least one servo read head disposed on a transducing surface of the substrate, said servo read head comprising:
      first and second trenches on the transducing surface, said trenches having side portions and a bottom portion;
      a first magnetic layer on the side and bottom portions of the first and second trenches;
      a first insulation layer on the first magnetic layer;
      a conductive coil having at least one turn on the first insulation layer in the first and second trenches;
      a second insulation layer on the conductive coil and the first insulation layer in the first and second trenches;
      a second magnetic layer on the second insulation layer in the first trench, said second magnetic layer in contact with the first magnetic layer at the side portions of the first trench forming a magnetic yoke enclosing the at least one turn of the conductive coil in the first trench; and
      wherein the second magnetic layer has a read gap at the transducing surface; and
   an overlayer on the second magnetic layer and the transducing surface.

2. The magnetic head of claim 1 wherein the conductive coil is a planar coil.

3. The magnetic head of claim 1 wherein the first and second magnetic layers are made of Ni—Fe.

4. The magnetic head of claim 1 wherein the conductive coil is made of copper.

5. The magnetic head of claim 1 wherein the first and second insulating layers are made of $Al_2O_3$ or $SiO_2$.

6. A magnetic head comprising:
   a nonmagnetic substrate;
   at least one servo read head disposed on a transducing surface of the substrate, said servo read head comprising:
      a trench on the transducing surface, said trench having side portions and a bottom portion;
      a first magnetic layer on the side and bottom portions of the trench; wherein said first magnetic layer has a gap at the bottom portion of the trench;
      a read transducer positioned in the gap in the first magnetic layer;
      an insulation layer on the first magnetic layer and the read transducer;
      a second magnetic layer on the insulation layer, said second magnetic layer in contact with the first magnetic layer at the side portions of the trench forming a magnetic flux guide from the transducing surface to the read transducer; and
      wherein the second magnetic layer has a read gap at the transducing surface; and
   an overlayer on the second magnetic layer and the transducing surface.

7. The magnetic head of claim 6 wherein the read transducer is chosen from the group of sensors consisting of AMR, GMR and MTJ sensors.

8. The magnetic head of claim 6 wherein the first and second magnetic materials are made of Ni—Fe.

9. The magnetic head of claim 6 wherein the insulating layer is made of $Al_2O_3$ or $SiO_2$.

10. A magnetic head comprising:
a nonmagnetic substrate;
at least one servo read head disposed on a transducing surface of the substrate, said servo read head comprising:
  a trench on the transducing surface, said trench having side portions and a bottom portion;
  a first magnetic layer on the side and bottom portions of the trench;
  a read transducer positioned on the bottom portion of first magnetic layer;
  an insulation layer on the first magnetic layer and the read transducer;
  a second magnetic layer on the insulation layer, said second magnetic layer in contact with the first magnetic layer at the side portions of the trench forming a magnetic flux guide from the transducing surface to the read transducer; and
  wherein the second magnetic layer has a read gap at the transducing surface; and
an overlayer on the second magnetic layer and the transducing surface.

11. The magnetic head of claim 10 wherein the read transducer is chosen from the group of sensors consisting of AMR, GMR and MTJ sensors.

12. The magnetic head of claim 10 wherein the first and second magnetic materials are made of Ni—Fe.

13. The magnetic head of claim 10 wherein the insulating layer is made of $Al_2O_3$ or $SiO_2$.

14. A magnetic head, comprising;
a nonmagnetic substrate;
  at least one servo read head disposed on a transducing surface of the substrate, said servo read head comprising:
    a trench on the transducing surface, said trench having side portions and a bottom portion;
    a magnetic transducer means for sensing magnetic signals from a magnetic recording medium, said magnetic transducer means positioned at the bottom portion of the trench; and
    a magnetic flux guide means for directing said magnetic signals from a read gap at the transducing surface of the substrate to the magnetic transducer means at the bottom of the trench.

15. A servo formatting system, comprising:
a magnetic recording tape;
a tape drive for moving the magnetic recording tape linearly;
a servo write head for magnetically recording a servo pattern on the magnetic recording tape; and
a servo verifier read head, comprising
  a nonmagnetic substrate;
  at least one servo read head disposed on a transducing surface of the substrate, said servo read head comprising:
    first and second trenches on the transducing surface, said trenches having side portions and a bottom portion;
    a first magnetic layer on the side and bottom portions of the first and second trenches;
    a first insulation layer on the first magnetic layer;
    a conductive coil having at least one turn on the first insulation layer in the first and second trenches;
    a second insulation layer on the conductive coil and the first insulation layer in the first and second trenches;
    a second magnetic layer on the second insulation layer in the first trench, said second magnetic layer in contact with the first magnetic layer at the side portions of the first trench forming a magnetic yoke enclosing the at least one turn of the conductive coil in the first trench; and
    wherein the second magnetic layer has a read gap at the transducing surface; and
  an overlayer on the second magnetic layer and the transducing surface; and
a pattern verifier for checking the servo pattern recorded on the magnetic recording tape, said servo pattern read by the servo verifier read head.

16. A servo formatting system, comprising:
a magnetic recording tape;
a tape drive for moving the magnetic recording tape linearly;
a servo write head for magnetically recording a servo pattern on the magnetic recording tape; and
a servo verifier read head, comprising
  a nonmagnetic substrate;
  at least one servo read head disposed on a transducing surface of the substrate, said servo read head comprising:
    a trench on the transducing surface, said trench having side portions and a bottom portion;
    a first magnetic layer on the side and bottom portions of the trench;
    a read transducer positioned on the bottom portion of first magnetic layer;
    an insulation layer on the first magnetic layer and the read transducer;
    a second magnetic layer on the insulation layer, said second magnetic layer in contact with the first magnetic layer at the side portions of the trench forming a magnetic flux guide from the transducing surface to the read transducer; and
    wherein the second magnetic layer has a read gap at the transducing surface; and
  an overlayer on the second magnetic layer and the transducing surface; and
a pattern verifier for checking the servo pattern recorded on the magnetic recording tape, said servo pattern read by the servo verifier read head.

* * * * *